(No Model.)

H. R. FRISBIE.
RENEWABLE PACKING RING.

No. 401,262. Patented Apr. 9, 1889.

Witnesses.
Wm. J. Bellows
G. M. Chamberlain.

Inventor,
Henry R. Frisbie,
By his Attorneys

UNITED STATES PATENT OFFICE.

HENRY R. FRISBIE, OF MANSFIELD, OHIO.

RENEWABLE PACKING-RING.

SPECIFICATION forming part of Letters Patent No. 401,262, dated April 9, 1889.

Application filed April 11, 1888. Serial No. 270,317. (No model.)

*To all whom it may concern:*

Be it known that I, HENRY R. FRISBIE, a citizen of the United States, residing at Mansfield, in the county of Richland and State of Ohio, have invented new and useful Improvements in Renewable Packing-Rings, of which the following is a specification.

This invention relates to packing-rings for screw-coupled union-joints, water and other pipes, and similar uses, the object being to provide an improved renewable packing for said purposes, and one which is capable of substituting packing material according to the service demanded of it, whether it be for water-pipe, high or low pressure steam-pipe, or for use in pipes used to convey certain chemical substances which require special packing which will resist the action of the chemicals; and the invention consists in the peculiar construction and arrangement of the various elements of the packing-ring, all as hereinafter fully described, and pointed out in the claim.

Figure 1:
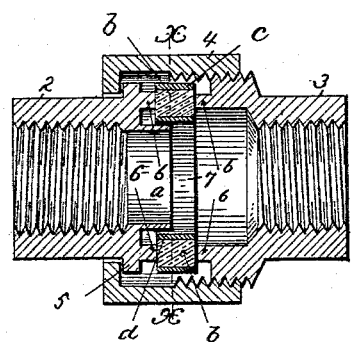
Figure 2:
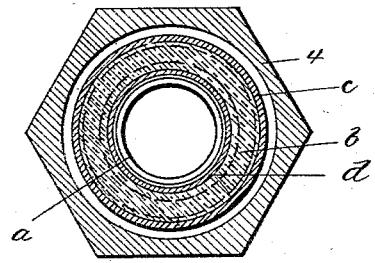
Figure 3:
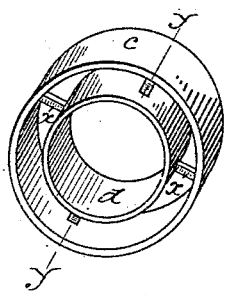
Figure 4:
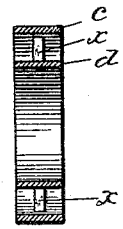

In the drawings forming part of this specification, Figure 1 is a longitudinal section of a union-joint provided with a renewable packing-ring constructed according to my invention. Fig. 2 is a transverse section on line $x$ $x$, Fig. 1. Fig. 3 is a perspective view of the skeleton or shell parts of the ring; and Fig. 4 is a transverse section on line $y$ $y$, Fig. 3.

In the drawings, 2 3 indicate the opposite ends or tubular portions of a union, or "union-joint," as it is ordinarily termed; and 4, the nut of the union, which slips over the end 2 thereof against a shoulder, 5, thereon, and is screwed onto the adjoining end 3 of the union, and thereby the meeting ends thereof are drawn toward each other and against the opposite sides of a packing ring or gasket placed between them. In the union construction herein shown the ends of the body or tubular parts 2 3 within the nut 4 have each an annular projection, 6, thereon, which projections constitute the bearing-surfaces of the said body parts, between which the packing-ring 7 is clamped by the action of the nut 4 when the latter is forcibly screwed onto the part 3 of the union, and thereby the ends of said annular projections become so forced against the opposite sides of the packing-ring or more or less embedded therein that a perfectly-tight joint is formed between said projections. The said body part 2 of the union is made preferably with its inner end, $a$, extending in tubular form within and somewhat beyond the end of the said annular projection 6 thereon and concentric therewith, whereby a centering guide or holder is provided on which the packing-ring 7 may be placed preliminary to securing the ends of the parts 2 and 3 thereagainst, as above described. Said guide or holder $a$ by entering the packing-ring, as shown in Fig. 1, serves to hold it in a position concentric with the ends or projections 6 of the union, so that the packing-surfaces of the ring will be held opposite the ends of said projections 6. The said packing-ring 7 consists of two preferably metallic annular casing parts or rings, $c$ $d$, one within the other, and having preferably the intermediate connecting-arms, $x$, whereby they are more rigidly held in proper relative positions for receiving the packing substance between them, as below described, than if said arms be omitted, although after said substance is forced between said rings they are thereby held in proper relation to each other by their frictional engagement with said packing, and still more so when the latter becomes more or less expanded by pressure between the said annular projections 6 of the union, as above described. The arms $x$ between the outer and inner casings, $c$ and $d$, serve also to hold the packing substance in place between said casings. The space between said annular packing-rings $c$ and $d$ is filled with a packing substance, $b$, of either rubber, leather, textile material or fiber, asbestus, soft metal, or other suitable or desirable substance capable of acting as a packing between the bearing ends of the union or other thing or things between which said ring is inserted and clamped. Said packing substance, $b$, is suitably forced, cast, or pressed between said rings, and the opposite surfaces thereof are finished substantially in a plane with the opposite ends or edges of said rings. It is obvious that said packing, consisting of the said casing parts $c$ and $d$ and the intermediate packing substance, may be given other forms than the cylindrical one herein shown when required for a packing for oval man-holes or for valve-chests of engines, and that the ring 7 may be conveniently applied between the flanged ends of iron pipe as a packing, said ends having suitable annular projections to bear against the packing substance in said ring, and having the usual bolts passing through the flanges, whereby the ends of the pipes are forced against said ring. Furthermore, said packing-ring possesses peculiar practical advantages, in that the casing-rings $c$ and $d$ are adapted to receive said various packing substances for different services, and that the packing of a ring which has become deteriorated from use may be easily renewed with the same or a similar substance, and oftentimes much inconvenience be thereby obviated.

What I claim as my invention is—

A packing-ring consisting of two metallic concentric rings, one within the other, and the intermediate connecting-arms, $x\ x$, with openings between them, and of a yielding packing substance interposed between said rings surrounding and interlocking said arms, and having exposed bearing-surfaces at opposite ends thereof, substantially as set forth.

HENRY R. FRISBIE.

Witnesses:
 REID CARPENTER,
 F. B. BLACK.

It is hereby certified that Letters Patent No. 401,262, granted April 9, 1889, upon the application of Henry R. Frisbie, of Mansfield, Ohio, for an improvement in "Renewable Packing Rings," was erroneously issued to said Frisbie as owner of the said invention; that said Letters Patent should have been issued to *The Barnett Brass Company, of same place*, said Barnett Brass Company being owner of the entire interest therein, as shown by the record of assignments in this Office; and that said Letters Patent should be read with this correction therein that the same may conform to the record of the case in the Patent Office.

Signed, countersigned and sealed this 14th day of May, A. D. 1889.

[SEAL.]

CYRUS BUSSEY,
*Assistant Secretary of the Interior.*

Countersigned:

C. E. MITCHELL,
*Commissioner of Patents.*